(12) United States Patent
Jung et al.

(10) Patent No.: US 10,493,942 B2
(45) Date of Patent: Dec. 3, 2019

(54) DEVICE FOR OPERATING HORN OF VEHICLE

(71) Applicants: Hyundai Motor Company, Seoul (KR); Kia Motors Corporation, Seoul (KR)

(72) Inventors: Un Jae Jung, Gyeonggi-do (KR); Joon Mo Park, Seoul (KR); Tae Wook Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 78 days.

(21) Appl. No.: 15/813,555

(22) Filed: Nov. 15, 2017

(65) Prior Publication Data

US 2018/0370477 A1  Dec. 27, 2018

(30) Foreign Application Priority Data

Jun. 27, 2017  (KR) ........................ 10-2017-0080973

(51) Int. Cl.
| | |
|---|---|
| *B60R 21/2165* | (2011.01) |
| *B60R 16/02* | (2006.01) |
| *B60R 21/203* | (2006.01) |
| *B60R 16/027* | (2006.01) |
| *B60Q 5/00* | (2006.01) |

(52) U.S. Cl.
CPC .... *B60R 21/21658* (2013.01); *B60R 16/0207* (2013.01); *B60R 16/027* (2013.01); *B60R 21/2037* (2013.01); *B60Q 5/003* (2013.01)

(58) Field of Classification Search
CPC .......... B60R 21/21658; B60R 21/2037; B60R 16/0207; B60Q 5/003
See application file for complete search history.

(56) References Cited

U.S. PATENT DOCUMENTS

| | | | | |
|---|---|---|---|---|
| 5,327,796 | A * | 7/1994 | Ernst ...................... | B60Q 5/003 200/61.55 |
| 5,593,178 | A * | 1/1997 | Shiga ..................... | B60Q 5/003 200/61.55 |
| 5,650,600 | A * | 7/1997 | Walters .................. | B60Q 5/003 200/61.54 |
| 5,738,369 | A * | 4/1998 | Durrani .................. | B60Q 5/003 280/728.2 |
| 6,199,899 | B1 * | 3/2001 | Krebs .................... | B60R 21/217 280/728.2 |
| 6,244,618 | B1 * | 6/2001 | Yokota ................... | B60Q 5/003 200/61.55 |

(Continued)

*Primary Examiner* — Drew J Brown
(74) *Attorney, Agent, or Firm* — Mintz Levin Cohn Ferris Glovsky and Popeo, P.C.; Peter F. Corless

(57) ABSTRACT

A device for operating a horn of a vehicle includes: a horn operation cover covering a top portion and a circumference of an airbag module mounted on a frame of a steering wheel of the vehicle, the horn operation cover configured to be moved downward or upward; a conductive plate spring having one end fixed to the frame and another end in contact with the horn operation cover; and a conductive contact terminal disposed under the plate spring such that a contact between the contact terminal and the plate spring is possible. When the horn operation cover is moved downward so as to press the other end of the plate spring, the plate spring electrically contacts the contact terminal, thereby operating the horn.

7 Claims, 6 Drawing Sheets

(56) References Cited

U.S. PATENT DOCUMENTS

| | | | | |
|---|---|---|---|---|
| 7,159,898 B2* | 1/2007 | Thomas | ............... | B60Q 5/003 |
| | | | | 200/61.55 |
| 7,173,202 B2* | 2/2007 | Tsujimoto | ............. | B60Q 5/003 |
| | | | | 200/61.54 |
| 2001/0054809 A1* | 12/2001 | Igawa | ................. | B60Q 5/003 |
| | | | | 280/728.2 |
| 2004/0046367 A1* | 3/2004 | Schneider | ............ | B60Q 5/003 |
| | | | | 280/728.2 |
| 2005/0012311 A1* | 1/2005 | Schneider | ............ | B60Q 5/003 |
| | | | | 280/731 |
| 2007/0045996 A1* | 3/2007 | Frisch | ............... | B60R 21/2035 |
| | | | | 280/728.3 |
| 2009/0091107 A1* | 4/2009 | Shimazaki | ........... | B60Q 5/003 |
| | | | | 280/731 |
| 2010/0059973 A1* | 3/2010 | Fujita | ............... | B60R 21/2037 |
| | | | | 280/731 |
| 2012/0098241 A1* | 4/2012 | Nebel | ............... | B60R 21/2037 |
| | | | | 280/741 |
| 2013/0239739 A1* | 9/2013 | Miyahara | .......... | B60R 21/2037 |
| | | | | 74/552 |
| 2014/0145420 A1* | 5/2014 | Amamori | .......... | B60R 21/2037 |
| | | | | 280/731 |
| 2015/0307051 A1* | 10/2015 | Collazo | ............... | B60Q 5/003 |
| | | | | 280/728.3 |

* cited by examiner

[FIG. 1]
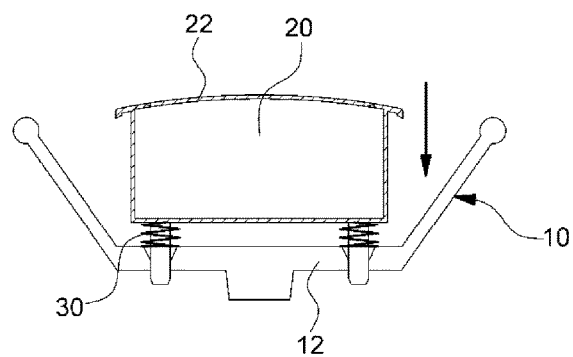
[FIG. 2]
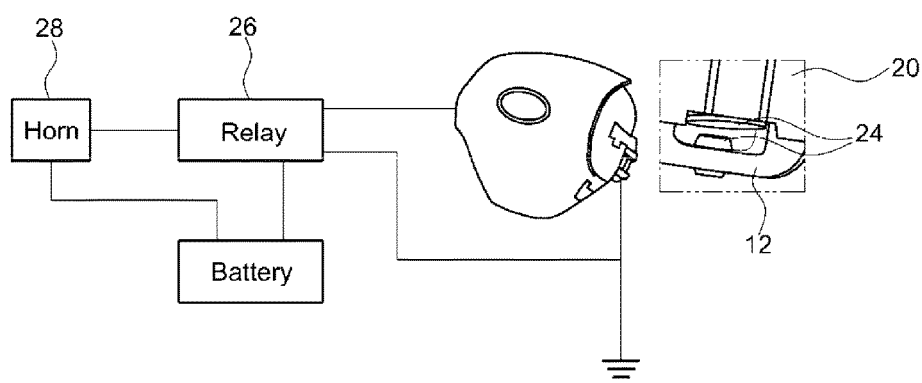

[FIG. 3]
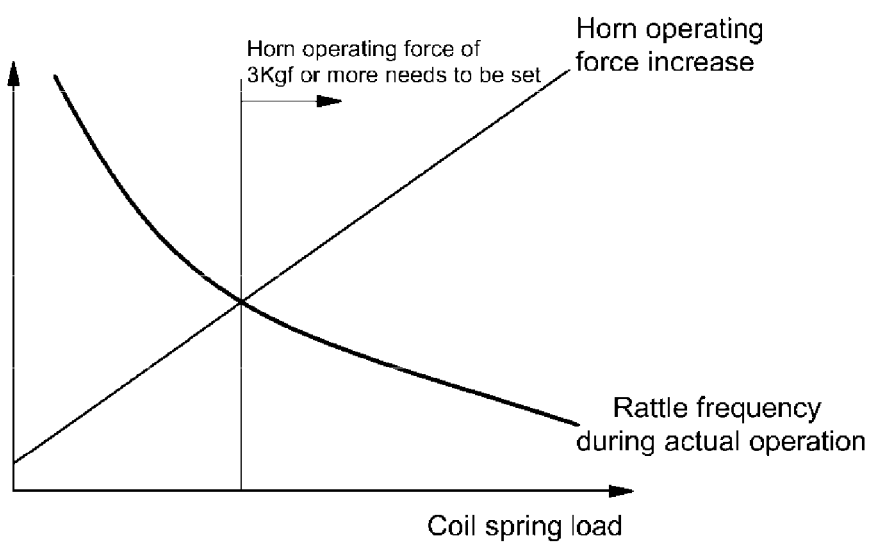

[FIG. 4]
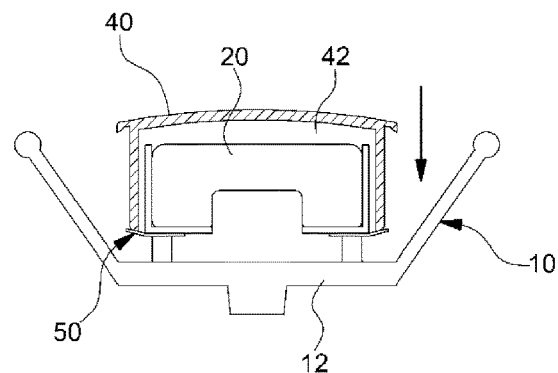
[FIG. 5]
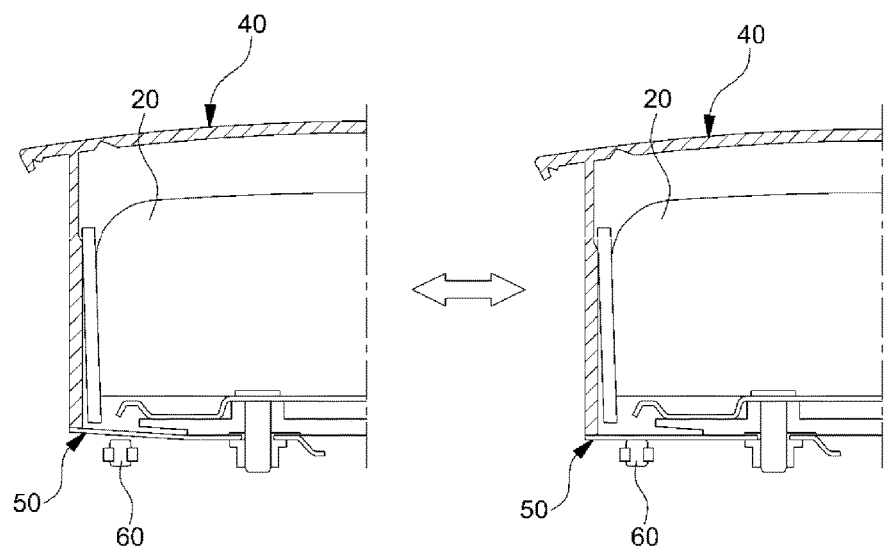

[FIG. 6]
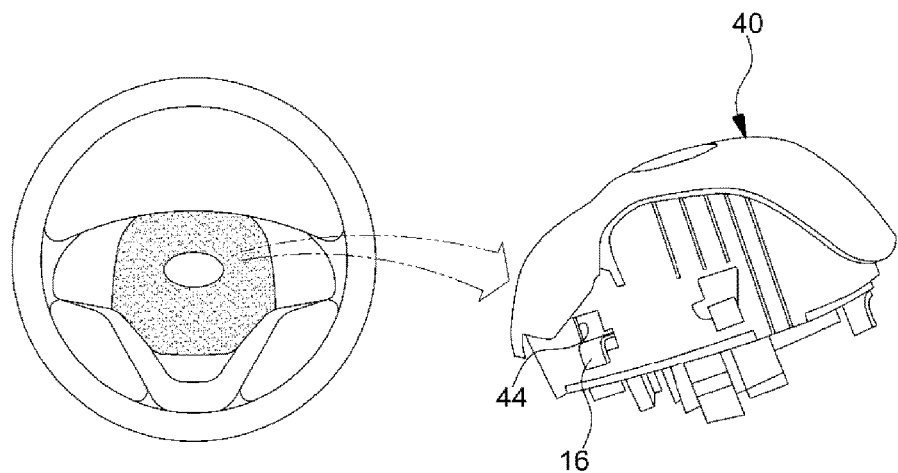
[FIG. 7]
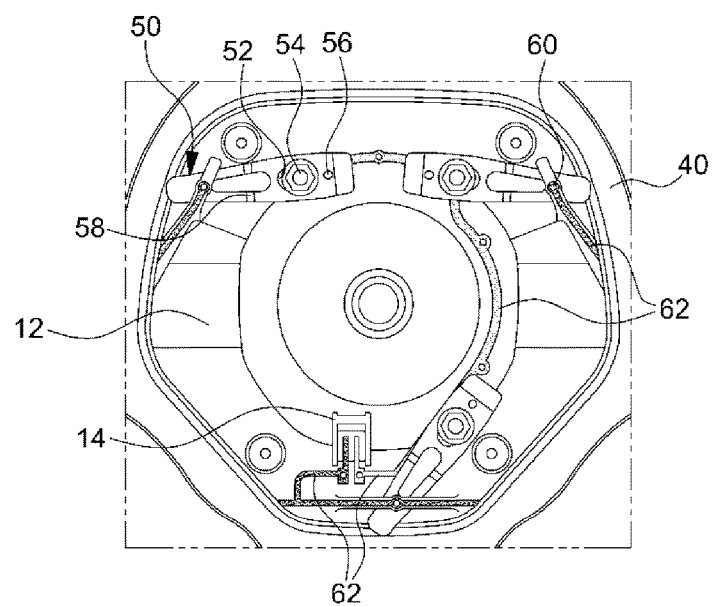

【FIG. 8】
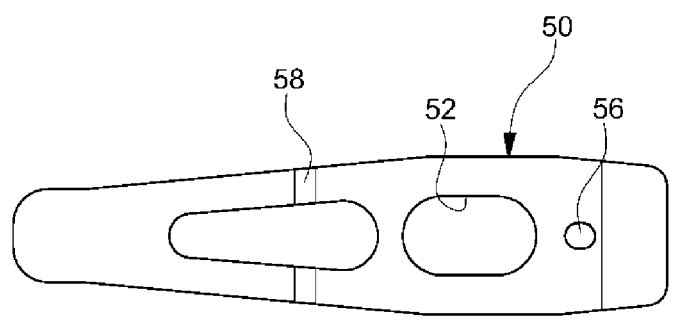

[FIG. 9]
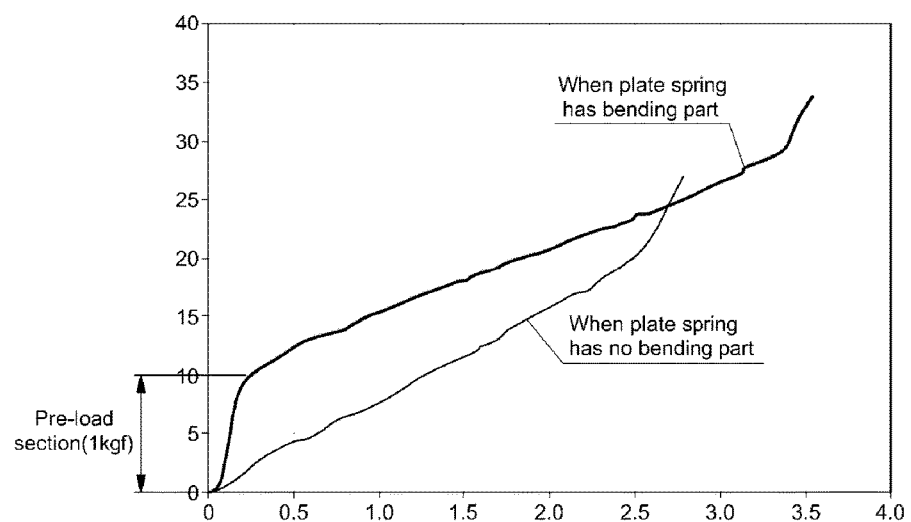

DEVICE FOR OPERATING HORN OF VEHICLE

CROSS-REFERENCE TO RELATED APPLICATION

This application claims under 35 U.S.C. § 119(a) the benefit of priority to Korean Patent Application No. 10-2017-0080973 filed on Jun. 27, 2017, the entire contents of which are incorporated herein by reference.

BACKGROUND (a) Technical Field

The present disclosure relates generally to a device for a vehicle. More particularly, it relates to a device for operating a horn of a vehicle.

(b) Background Art

In many vehicles, an airbag module for the driver's seat is typically installed in a central portion of the steering wheel, and a horn cover is formed on a front surface of the central portion of the steering wheel. The horn cover not only serves as a cover for the airbag module, but is also used for operating the horn.

As shown in FIG. 1, a conventional airbag module 20 is disposed in a central portion of a steering wheel 10, and the entire surface of the airbag module 20 is covered by a cover 22 used for operating a horn. A plurality of compressible coil springs 30 are connected between a frame 12 of the steering wheel 10 and the bottom of the airbag module 20 covered by the cover 22. When the airbag module 20 explodes, the cover 22 is torn to deploy an airbag.

As shown in FIG. 2, which illustrates a circuit configuration for operating the horn, a contact switch 24 is mounted between the frame 12 of the steering wheel 10 and the bottom of the airbag module 20 covered by the cover 22. The contact switch 24 is connected to the horn 28 through a relay 26. Therefore, when a driver holds down the cover 22 in order to operate the horn, both of the cover 22 and the airbag module 20 are moved downward while compressing the coil springs 30. When the driver takes his or her hand off the cover 22, the horn cover 22 and the airbag module 20 are moved upward to the original position by the elastic restoring force of the coil spring 30.

At this time, when the driver holds down the cover 22 such that both of the cover 22 and the airbag module 20 are moved downward to a predetermined length or more while compressing the coil springs 30, a switching-on state is achieved while electricity is conducted through the contact switch 24. The horn 28 generates a horn sound as a result.

However, the conventional horn operating device demonstrated in FIGS. 1 and 2 has the following problems.

First, when the repulsive force of the coil spring is lowered for an operation of the horn, as illustrated in FIG. 3, a rattle may occur. Conversely, when the repulsive force of the coil spring is raised to prevent the rattle, a horn operating force needed to operate the horn may increase. The horn operating force refers to a force required for moving the airbag module downward while overcoming the repulsive force of the coil spring.

As an example, the horn operating force applied by the driver may be set to 3 Kgf or more when the driver holds down the cover. In this case, the driver may experience a heavy operating sensation while holding down the cover. On the other hand, when a coil spring with a low repulsive force is employed in order to reduce the horn operating force, the driver may operate the horn with a small force, but the support force of the coil spring on the airbag module may be weakened. In this case, the entire airbag module may rattle due to driving vibration.

Second, since a gap corresponding to the height of the coil spring is formed between the airbag module and the frame of the steering wheel, the horn operating force may be further increased when wiring is caught in the gap. In a worst case, the horn may not be operable while the downward movement of the airbag module is disturbed.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure is proposed for solving the above problems. The object of the present disclosure is to provide a device for operating a horn of a vehicle, which achieves a contact of a switch by only moving a horn operation cover downward with an airbag module fixed. As a result, the horn operating force required for operating the vehicle horn may be reduced, allowing the driver to feel that the horn is operated immediately upon applying force to the horn operation cover.

According to embodiments of the present disclosure, a device for operating a horn of a vehicle includes: a horn operation cover covering a top portion and a circumference of an airbag module mounted on a frame of a steering wheel of the vehicle, the horn operation cover configured to be moved downward or upward; a conductive plate spring having one end fixed to the frame and another end in contact with the horn operation cover; and a conductive contact terminal disposed under the plate spring such that a contact between the contact terminal and the plate spring is possible. When the horn operation cover is moved downward so as to press the other end of the plate spring, the plate spring electrically contacts the contact terminal, thereby operating the horn.

The plate spring may include a mounting hole for fixing the one end of the plate spring to the frame.

A position fixing hole may be formed at the one end of the plate spring adjacent to the mounting hole, the position fixing hole being electrically connected to a horn operation wiring line.

A bending structure may be formed at an intermediate portion of the plate spring, the bending structure providing a horn operating sensation when the horn is operated.

A horn operation wiring line may be connected to each of the plate spring and the contact terminal, and connected to a connector installed on the frame.

A slot may be formed at a circumference of the horn operation cover, and a guide protrusion may be formed at a circumference of the frame, the guide protrusion being inserted into the slot in order to guide the downward or upward movement of the horn operation cover.

A gap for the downward movement of the horn operation cover may be formed between a bottom surface of the horn operation cover and a top surface of the airbag module.

The embodiments of the present disclosure provide the following effects.

First, when a driver holds the horn operation cover, only the horn operation cover may be moved downward with the airbag module fixed, and a contact of the switch is achieved to operate the horn. Thus, the horn operating force can be reduced, compared to conventional vehicle horns in which a switching contact is achieved while the airbag module is moved downward. Therefore, the horn can be operated more smoothly since a weight sensation experienced by the driver when operating the horn can be reduced.

Second, the bending structure of the plate spring forms a pre-load section when the plate spring is pressed. Thus, a driver can experience a horn operating sensation the instance that the horn is operated.

Third, since only the horn operation cover is moved upward or downward with the airbag module fixed, it is possible to prevent interference which occurs when various wirings are caught between the airbag module and a conventional steering wheel.

The above and other features of the disclosure are discussed infra.

BRIEF DESCRIPTION OF THE DRAWINGS

The above and other features of the present disclosure will now be described in detail with reference to certain embodiments thereof illustrated the accompanying drawings which are given herein below by way of illustration only, and thus are not limitative of the present disclosure, and wherein:

FIG. 1 is a schematic cross-sectional view illustrating a conventional device for operating a horn of a vehicle;

FIG. 2 illustrates an electrical circuit configuration for operating a horn of a vehicle;

FIG. 3 is a graph illustrating the relationship between a conventional horn operating force required for operating the horn and a rattle occurrence rate;

FIG. 4 is a schematic view illustrating a device for operating a horn of a vehicle according to embodiments of the present disclosure;

FIG. 5 is a cross-sectional view illustrating elements of the horn operating device for a vehicle according to embodiments of the present disclosure;

FIG. 6 is a plan view illustrating a plate spring of the horn operating device for a vehicle according to embodiments of the present disclosure;

FIG. 7 is a bottom view illustrating an assembled state of the horn operating device for a vehicle according to embodiments of the present disclosure;

FIG. 8 is a perspective view illustrating a horn operation cover of the horn operating device for a vehicle according to embodiments of the present disclosure; and FIG. 9 is a graph comparatively illustrating horn operating sensations during operation of the horn operating device for a vehicle according to embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Referring now to embodiments of the present disclosure, FIGS. 4 and 5 are schematic cross-sectional views illustrating a device for operating a horn of a vehicle (hereinafter referred to as a "horn operating device") according to embodiments of the present disclosure, and reference numeral 40 represents a horn operation cover.

The horn operation cover 40 has an opened bottom, and also serves as an airbag cover for covering an airbag module 20 which is fixed to a frame 12 of a steering wheel 10. As the airbag module 20 is fixed and mounted on the frame 12 of the steering wheel 10, the horn operation cover 40 for covering the top portion and circumference of the airbag module 20 can be moved upward and downward.

The frame 12 of the steering wheel 10 has a conductive plate spring 50 mounted thereon, the plate spring 50 being pressed when the horn operation cover 40 is moved downward. More specifically, one end (inner end) of the plate spring 50 is fixed to the frame 12, and the other end (outer end) of the plate spring 50 is set as a free end which can be pressed by the horn operation cover 40.

A conductive contact terminal 60 is disposed under the plate spring 50. The contact terminal 60 can be contacted with the other end of the plate spring 50.

While the horn is not operated, the lowed end of the horn operation cover 40 is supported on the top surface of the other end of the plate spring 50 through a simple contact, and the plate spring 50 is not pressed but maintained in a neutral state in which the plate spring 50 has no elastic restoring force. Furthermore, a gap 42 for securing a downward movement distance of the horn operation cover 40 is formed between the bottom surface of the horn operation cover 40 and the top surface of the airbag module 20.

Therefore, when a driver holds down the horn operation cover 40 in order to operate the horn, only the horn operation cover 40 is moved downward to press the other end of the plate spring 50 downward. The pressed other end of the plate spring 50 continuously comes in contact with the conductive contact terminal 60 such that the plate spring 50 and the contact terminal 60 are electrically connected to each other. Then, the horn generates a horn sound.

Such a horn operating process according to embodiments of the present disclosure will be described in more detail later.

FIG. 6 is a plan view illustrating a plate spring of the horn operating device for a vehicle according to embodiments of the present disclosure, and FIG. 7 illustrates an assembled state of the horn operating device for a vehicle according to embodiments of the present disclosure.

As illustrated in FIGS. 6 and 7, a mounting hole 52 for fixing the plate spring 50 is formed at the one end (inner end) of the plate spring 50, and a bolt and nut 54 are coupled to each other through the mounting hole 52 in order to fix the plate spring 50 to the frame 12. Furthermore, a position fixing hole 56 to which a horn operation wiring line 62 is electrically connected is formed at an inner position adjacent to the formation position of the mounting hole at the one end of the plate spring 50.

Wit the horn operation wiring line 62 (for example, (+) line) connected to the position fixing hole 56 of the plate spring 50, a horn operation wiring line 62 (for example, (−) line) is also connected to the contact terminal 60, and an end of each of the horn operation wiring lines 62 is connected to a connector 14 installed in the frame 12. For reference, the connector 14 is connected to the horn for generating a horn sound, in order to supply power to the horn.

FIG. 8 is a perspective view illustrating the horn operation cover of the horn operating device for a vehicle according to embodiments of the present disclosure.

When the horn operation cover 40 is pressed and moved downward or moved upward to the original position, the horn operation cover 40 can move only in a linear fashion. To ensure linear movement, as illustrated in FIG. 6, a slot 44 is vertically formed through the circumference of the horn operation cover 40, and a guide protrusion 16 is formed at the circumference of the frame 12 and inserted into the slot 44 in order to guide the horn operation cover 40 to linearly move upward or downward. Thus, while the guide protrusion 16 of the frame 12 is moved along the slot 44 when the horn operation cover 40 is moved upward or downward, the guide protrusion 16 guides the horn operation cover 40 to linearly move upward or downward.

The operation flow of the horn operating device having the above-described structure according to embodiments of the present disclosure will be described as follows.

First, when a driver holds down the horn operation cover 40 in order to operate the horn, the horn operation cover 40 is moved downward by the gap 42 corresponding to the maximum distance to the airbag module 20. When only the horn operation cover 40 is moved downward with the airbag module 20 fixed, the lower end of the horn operation cover 40 presses the other end (outer end) of the plate spring 50. Also, when the other end of the plate spring 50 is moved downward with the one end set to a fixed end, the other end of the plate spring 50 continuously comes in contact with the conductive contact terminal 60, such that the plate spring 50 and the contact terminal 60 are electrically connected to each other. As such, when the driver holds down the airbag cover or the horn operation cover 40 in order to operate the horn, the horn is operated by a switching operation through an electrical contact between the conductive plate spring 50 and the contact terminal 60.

Since the horn operation wiring line 62 (for example, (+) line) is connected to the position fixing hole 56 of the plate spring 50, the horn operation wiring line 62 (for example, (−) line) is connected to the contact terminal 60, and the end of each of the horn operation wiring lines 62 is connected to the connector 14 installed on the frame 12, power is supplied to the horn through the connector 14, such that the horn generates a horn sound. When the horn is operated, only the horn operation cover 40 is moved with the airbag module fixed. Thus, the mass of the moved portion is reduced to ⅕, compared to conventional vehicle horns in which the entire airbag module is moved, which makes it possible to not only prevent a rattle, but also reduce the horn operating force.

For example, the horn operating force can be reduced to about 2 kgf which is smaller than the horn operating force of 3 kgf in conventional vehicle horns. When the driver holds down the horn operation cover 40, the plate spring 50 is bent toward the contact terminal 60 by a constant force. Thus, the driver may not correctly recognize the point of time that the horn is operated. However, it is desirable to allow the driver to experience a horn operating sensation the instant that the horn is actually operated.

For this operation, a bending structure may be applied to the plate spring 50 such that a pre-load section is formed when the plate spring is pressed. More specifically, a bending structure 58 is formed at an intermediate portion of the plate spring 50, that is, a portion adjacent to the mounting hole 52 between the one end and the other end of the plate spring 50. The bending structure 58 may be bent at a predetermined angle. Thus, when the plate spring 50 is pressed, the pre-load section is formed by the bending structure 58.

Referring now to FIG. 9, when the plate spring 50 does not have the bending structure 58, the driver may not correctly recognize the instant that the horn is operated, because the force pressing the plate spring 50 constantly changes. On the other hand, when the plate spring 50 has the bending structure 58, the pre-load section in which the force pressing the plate spring 50 is changed with a sharp slope is formed to allow the driver to correctly recognize the point of time that the horn is operated.

In other words, when holding down the horn operation cover 40, the driver can feel the moment that the pre-load section in which the force pressing the plate spring 50 is changed with a sharp slope is changed to a section in which the force pressing the plate spring 50 is changed with a gentle slope. Therefore, the driver can correctly recognize the point of time that the horn is operated, and thus have a satisfactory horn operating sensation.

The disclosure has been described in detail with reference to certain embodiments thereof. However, it will be appreciated by those skilled in the art that changes may be made in these embodiments without departing from the principles and spirit of the disclosure, the scope of which is defined in the appended claims and their equivalents.

What is claimed is:

1. A device for operating a horn of a vehicle, the device comprising:
   a horn operation cover covering a top portion and a circumference of an airbag module mounted on a frame of a steering wheel of the vehicle, the horn operation cover configured to be moved downward or upward;
   a conductive plate spring having one end fixed to the frame and another end in contact with the horn operation cover;

a conductive contact terminal disposed under the plate spring such that a contact between the contact terminal and the plate spring is possible; and a bending structure formed at an intermediate portion of the plate spring adjacent to a mounting hole between the one end and the other end of the plate spring, the bending structure being applied to the plate spring such that a pre-load section is formed when the plate spring is pressed, wherein, when the horn operation cover is moved downward so as to press the other end of the plate spring, the plate spring electrically contacts the contact terminal, thereby operating the horn.

2. The device of claim 1, wherein the plate spring includes the mounting hole for fixing the one end of the plate spring to the frame.

3. The device of claim 2, wherein a position fixing hole is formed at the one end of the plate spring adjacent to the mounting hole, the position fixing hole being electrically connected to a horn operation wiring line.

4. The device of claim 1, wherein the bending structure provides a horn operating sensation when the horn is operated.

5. The device of claim 1, wherein a horn operation wiring line is connected to each of the plate spring and the contact terminal and connected to a connector installed on the frame.

6. The device of claim 1, wherein:

a slot is formed at a circumference of the horn operation cover, and a guide protrusion is formed at a circumference of the frame, the guide protrusion being inserted into the slot in order to guide the downward or upward movement of the horn operation cover.

7. The device of claim 1, wherein a gap for the downward movement of the horn operation cover is formed between a bottom surface of the horn operation cover and a top surface of the airbag module.

* * * * *